(12) United States Patent
Yu et al.

(10) Patent No.: US 11,945,463 B2
(45) Date of Patent: Apr. 2, 2024

(54) NAVIGATION ROUTE PLANNING METHOD FOR AUTONOMOUS VEHICLES

(71) Applicants: Baidu USA LLC, Sunnyvale, CA (US); Baidu.com Times Technology (Beijing) Co., Ltd., Beijing (CN)

(72) Inventors: Ning Yu, Beijing (CN); Fan Zhu, Sunnyvale, CA (US)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 961 days.

(21) Appl. No.: 16/759,178

(22) PCT Filed: Mar. 26, 2020

(86) PCT No.: PCT/CN2020/081474
§ 371 (c)(1),
(2) Date: Apr. 24, 2020

(87) PCT Pub. No.: WO2021/189374
PCT Pub. Date: Sep. 30, 2021

(65) Prior Publication Data
US 2022/0297718 A1 Sep. 22, 2022

(51) Int. Cl.
*G01C 21/00* (2006.01)
*B60W 60/00* (2020.01)
*G01C 21/34* (2006.01)

(52) U.S. Cl.
CPC ......... *B60W 60/001* (2020.02); *G01C 21/343* (2013.01); *G01C 21/3446* (2013.01);
(Continued)

(58) Field of Classification Search
CPC .......... B60W 60/001; B60W 2520/06; B60W 2530/201; B60W 2552/05;
(Continued)

(56) References Cited

U.S. PATENT DOCUMENTS 11,243,532 B1 * 2/2022 Levihn .................. G06N 3/045
2015/0185026 A1 * 7/2015 Hightower ......... G01C 21/3658
701/533
(Continued)

FOREIGN PATENT DOCUMENTS

CN         106017491 A      10/2016
CN         107817000 A       3/2018
(Continued)

*Primary Examiner* — Khoi H Tran
*Assistant Examiner* — Tien Minh Le
(74) *Attorney, Agent, or Firm* — WOMBLE BOND DICKINSON (US) LLP

(57) ABSTRACT

A starting point, a set of one or more way points, and a destination point of a route along which the ADV is to be driven are determined. All lane segments near the starting point, the set of way points, and the destination point within a predetermined threshold distance are determined respectively. A set of route candidates are determined with an A-star (A*) searching algorithm based on a set of nodes representing all the lane segments near the starting point, the set of way points, and the destination point respectively. The route is selected from the set of route candidates based on respective costs of the set of route candidates. The ADV is being controlled to drive along the selected route autonomously.

20 Claims, 12 Drawing Sheets

(52) U.S. Cl.
CPC ..... *G01C 21/3484* (2013.01); *B60W 2520/06* (2013.01); *B60W 2530/201* (2020.02); *B60W 2552/05* (2020.02); *B60W 2552/10* (2020.02)

(58) Field of Classification Search
CPC ....... B60W 2552/10; B60W 30/18154; B60W 60/0011; G01C 21/343; G01C 21/3446; G01C 21/3484; G01C 21/3658
See application file for complete search history.

(56) References Cited

U.S. PATENT DOCUMENTS

| | | | |
|---|---|---|---|
| 2016/0341561 A1* | 11/2016 | Woolley | G01C 21/3658 |
| 2018/0107216 A1* | 4/2018 | Beaurepaire | G01C 21/3815 |
| 2019/0084571 A1 | 3/2019 | Zhu et al. | |
| 2019/0113354 A1* | 4/2019 | Matsumura | G01C 21/3469 |
| 2020/0011671 A1* | 1/2020 | Puri | G01C 21/3492 |
| 2020/0056895 A1 | 2/2020 | Nagy et al. | |
| 2021/0041255 A1* | 2/2021 | Schein | G01C 21/3461 |
| 2021/0146922 A1* | 5/2021 | Fuchs | B60W 30/0956 |
| 2021/0148725 A1 | 5/2021 | Watahiki et al. | |

FOREIGN PATENT DOCUMENTS

| | | |
|---|---|---|
| CN | 107843267 A | 3/2018 |
| CN | 109489675 A | 3/2019 |
| CN | 109491378 A | 3/2019 |
| CN | 110196056 A | 9/2019 |
| CN | 110657818 A | 1/2020 |
| KR | 20180040246 A | 4/2018 |
| WO | 2019198481 A1 | 10/2019 |

\* cited by examiner

NAVIGATION ROUTE PLANNING METHOD FOR AUTONOMOUS VEHICLES

CROSS-REFERENCE TO RELATED APPLICATION

This patent application is a U.S. National Phase Application under 35 U.S.C. § 371 of International Application No. PCT/CN2020/081474, filed Mar. 26, 2020, entitled "A NAVIGATION ROUTE PLANNING METHOD FOR AUTONOMOUS VEHICLES," which is incorporated by reference herein by its entirety.

TECHNICAL FIELD

Embodiments of the present disclosure relate generally to operating autonomous vehicles. More particularly, embodiments of the disclosure relate to navigation route planning.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional route planning operations may result in unexpected navigation routes under some circumstances. For example, when a start point or destination point of an autonomous driving vehicle (ADV) is located in a road junction, it may be difficult to find a correct start search node using A-star (A*) searching algorithm due to the complexity of the situation. Thus, a resulted navigation route may be unexpected and incorrect.

SUMMARY

Embodiments of the present disclosure provide a computer-implemented method for operating an autonomous driving vehicle (ADV), a non-transitory machine-readable medium, and a data processing system.

Some embodiments of the present disclosure provide a computer-implemented method for operation an autonomous driving vehicle (ADV), the method includes: determining a starting point, a set of one or more way points, and a destination point of a first route along which the ADV is to be driven; determining all lane segments near the starting point, the set of way points, and the destination point within a predetermined threshold distance respectively; determining a set of route candidates using an A-star (A*) searching algorithm based on a set of nodes representing all lane segments near the starting point, the set of way points, and the destination point respectively; selecting a second route from the set of route candidates based on respective costs of the set of route candidates; and controlling the ADV to drive along the selected route autonomously.

Some embodiments of the present disclosure provide a non-transitory machine-readable medium, the medium has instructions stored therein, which when executed by a processor, cause the processor to perform operations, the operations includes: determining a starting point, a set of one or more way points, and a destination point of a first route along which the ADV is to be driven; determining all lane segments near the starting point, the set of way points, and the destination point within a predetermined threshold distance respectively; determining a set of route candidates using an A-star (A*) searching algorithm based on a set of nodes representing all lane segments near the starting point, the set of way points, and the destination point respectively; selecting a second route from the set of route candidates based on respective costs of the set of route candidates; and controlling the ADV to drive along the selected route autonomously.

Some embodiments of the present disclosure provide a data processing system, the system includes: a processor; and a memory coupled to the processor to store instructions, which when executed by the processor, cause the processor to perform operations, the operations including: determining a starting point, a set of one or more way points, and a destination point of a first route along which the ADV is to be driven; determining all lane segments near the starting point, the set of way points, and the destination point within a predetermined threshold distance respectively; determining a set of route candidates using an A-star (A*) searching algorithm based on a set of nodes representing all lane segments near the starting point, the set of way points, and the destination point respectively; selecting a second route from the set of route candidates based on respective costs of the set of route candidates; and controlling the ADV to drive along the selected route autonomously.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a method is disclosed herein to address unexpected results of navigation route planning issues when an ADV is located in a road junction. The method is also suitable for the regular road scenarios. In the method, according to a start point, a series of way points and a destination point of the ADV, all candidate navigation routes are searched. For example, Cartesian products of sets of a sets of topology nodes corresponding to all the candidate navigation routes may be generated. Then, results of the Cartesian products of the sets of topology nodes may be traversed and A-star (A*) search algorithm may be used to search all candidate navigation routes. Next, all the candidate navigation routes may be merged and a best candidate navigation route may be selected from all the candidate navigation routes according to their respective cost.

According to some embodiments, a starting point, a set of one or more way points, and a destination point of a route along which the ADV is to be driven are determined. All lane segments near the starting point, the set of way points, and the destination point within a predetermined threshold distance are determined respectively. A set of route candidates are determined with an A-star (A*) searching algorithm based on a set of nodes representing all the lane segments near the starting point, the set of way points, and the destination point respectively. The route is selected from the set of route candidates based on respective costs of the set of route candidates. The ADV is being controlled to drive along the selected route autonomously.

Figure 1:
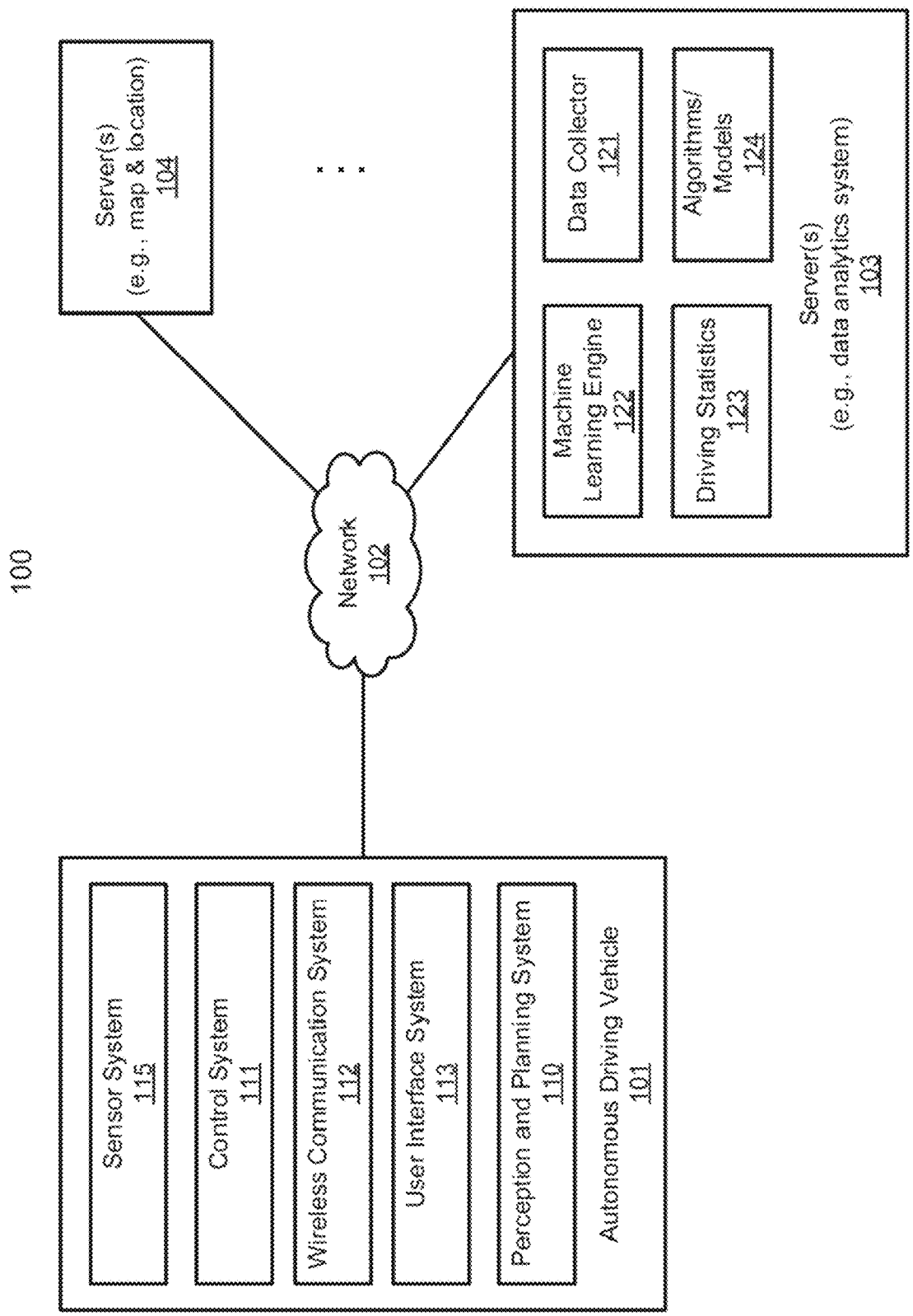
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
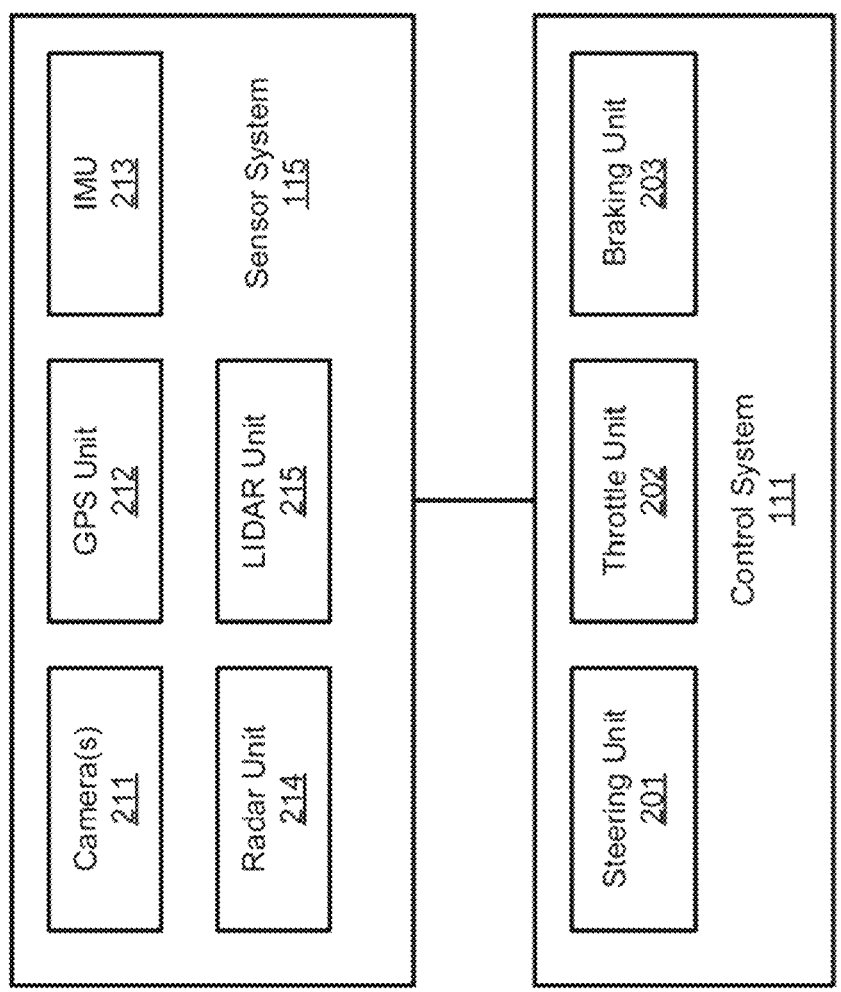
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm or model to determine a starting point, a set of one or more way points, and a destination point of a route, an algorithm or model determine all lane segments near the starting point, the set of way points, and the destination point within a predetermined threshold distance respectively, an algorithm or model to searching for a set of route candidates with an A-star (A*) searching algorithm based on a plurality of nodes representing all the lane segments near the starting point, the set of way points, and the destination point respectively, an algorithm or model to select the route from the set of route candidates based on respective costs of the set of route candidates, and/or an algorithm or model to control the ADV to drive along the selected route autonomously, which will be described in details further below. Algorithms 124 can then be uploaded on ADVs to be utilized during autonomous driving in real-time.

Figure 3A:
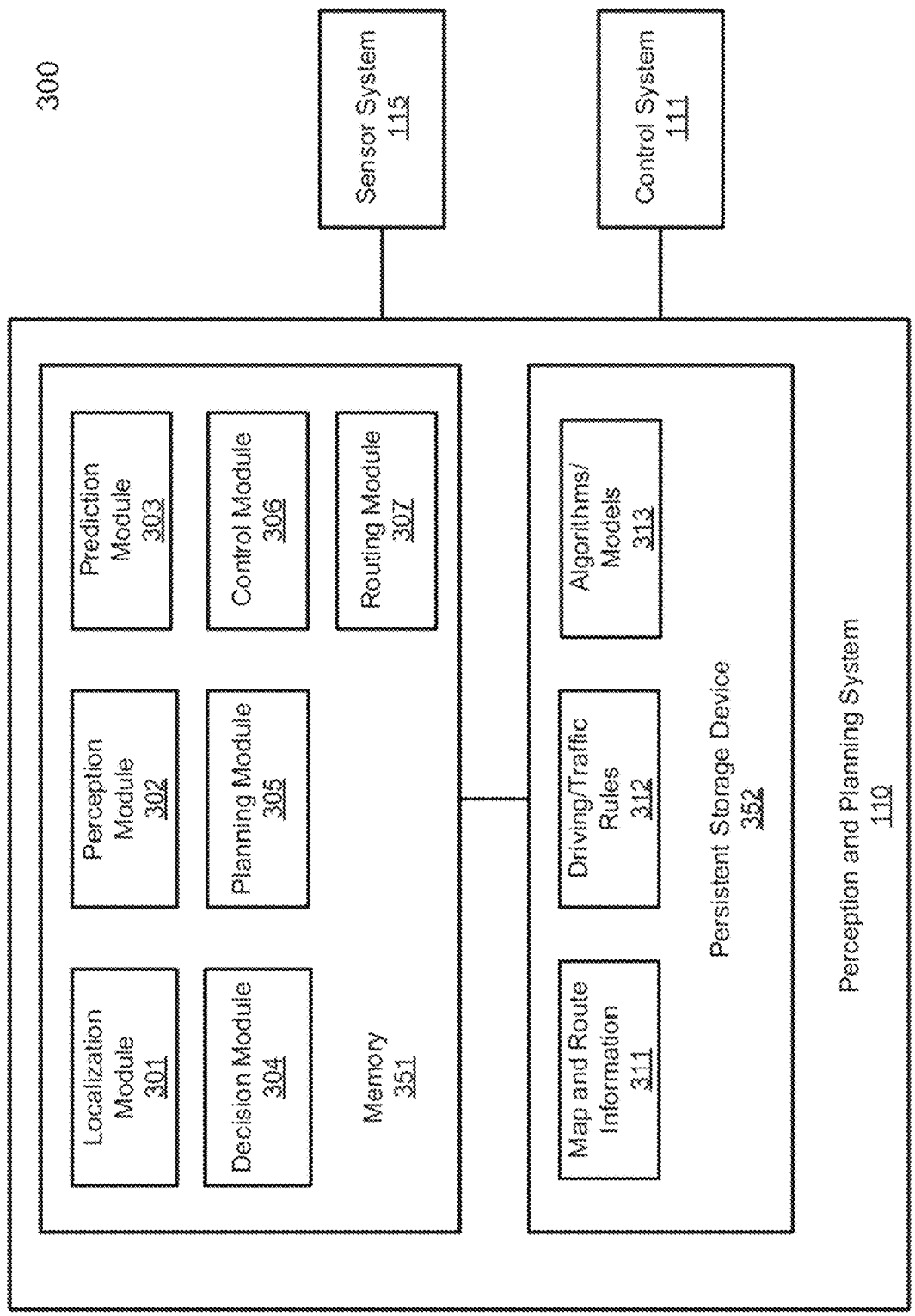
FIGS. 3A-3B are block diagrams illustrating an example of a perception and planning system used with an autonomous vehicle according to one embodiment.
Figure 3B:
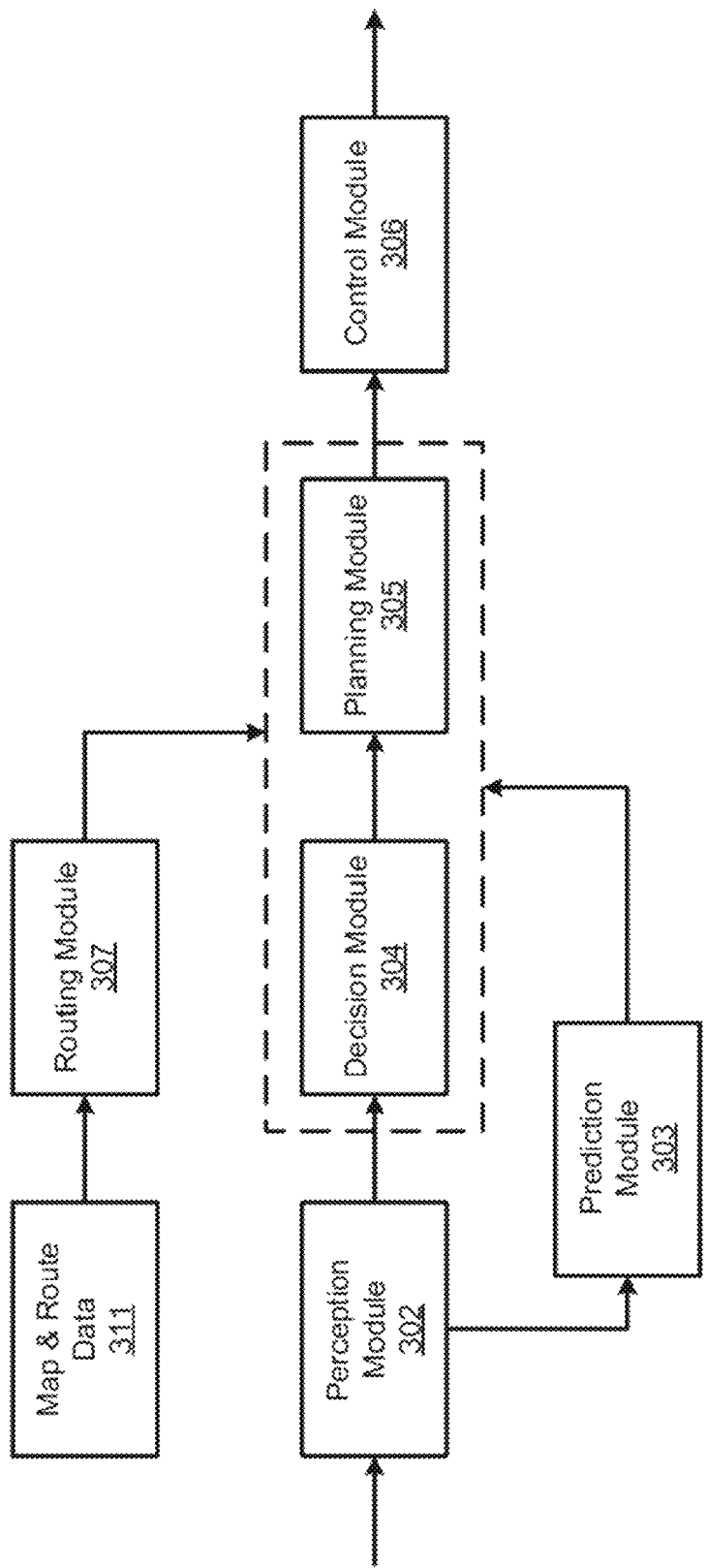

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4:
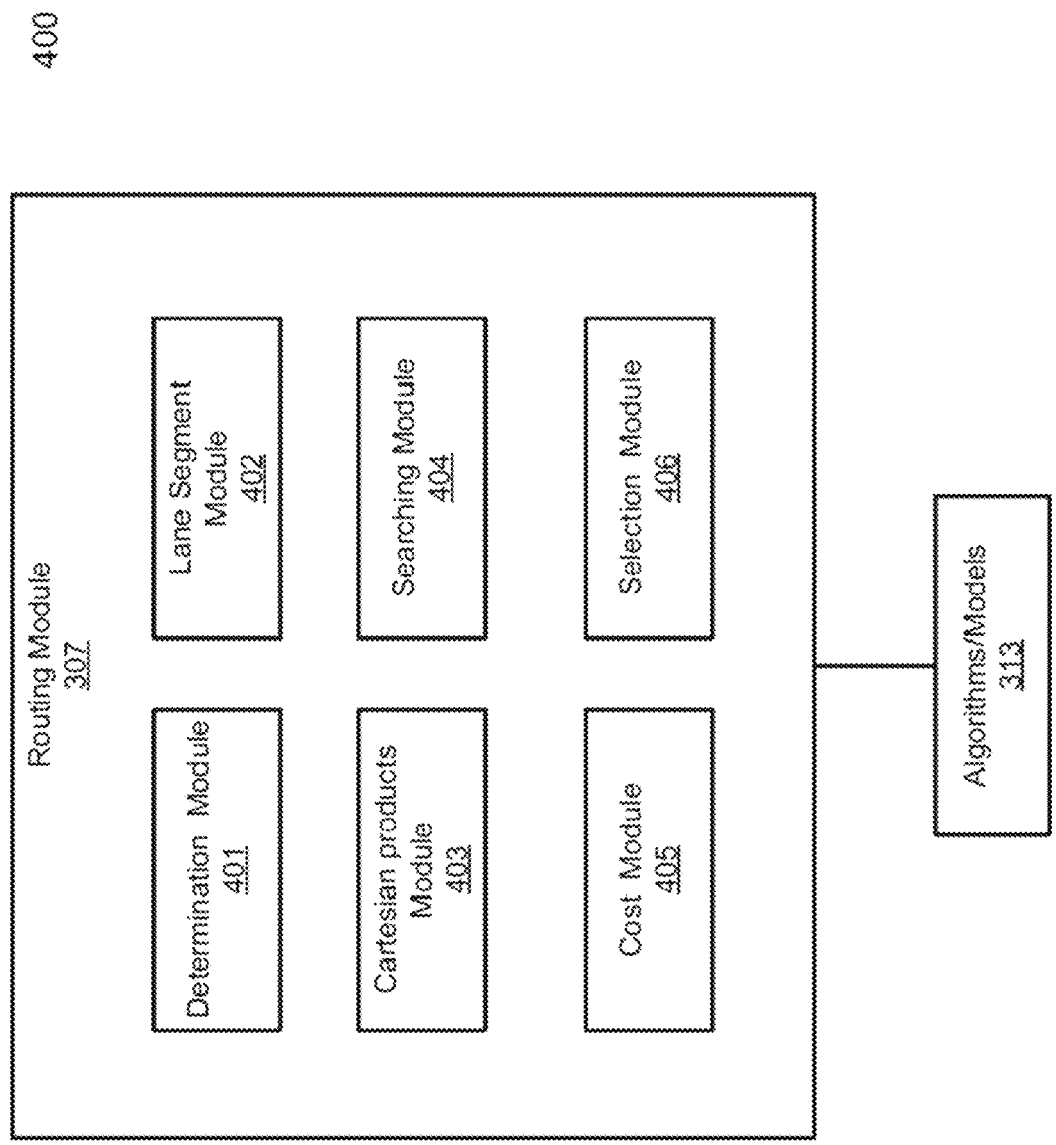
FIG. 4 is a block diagram illustrating an example of a routing module according to one embodiment.
Figure 5:
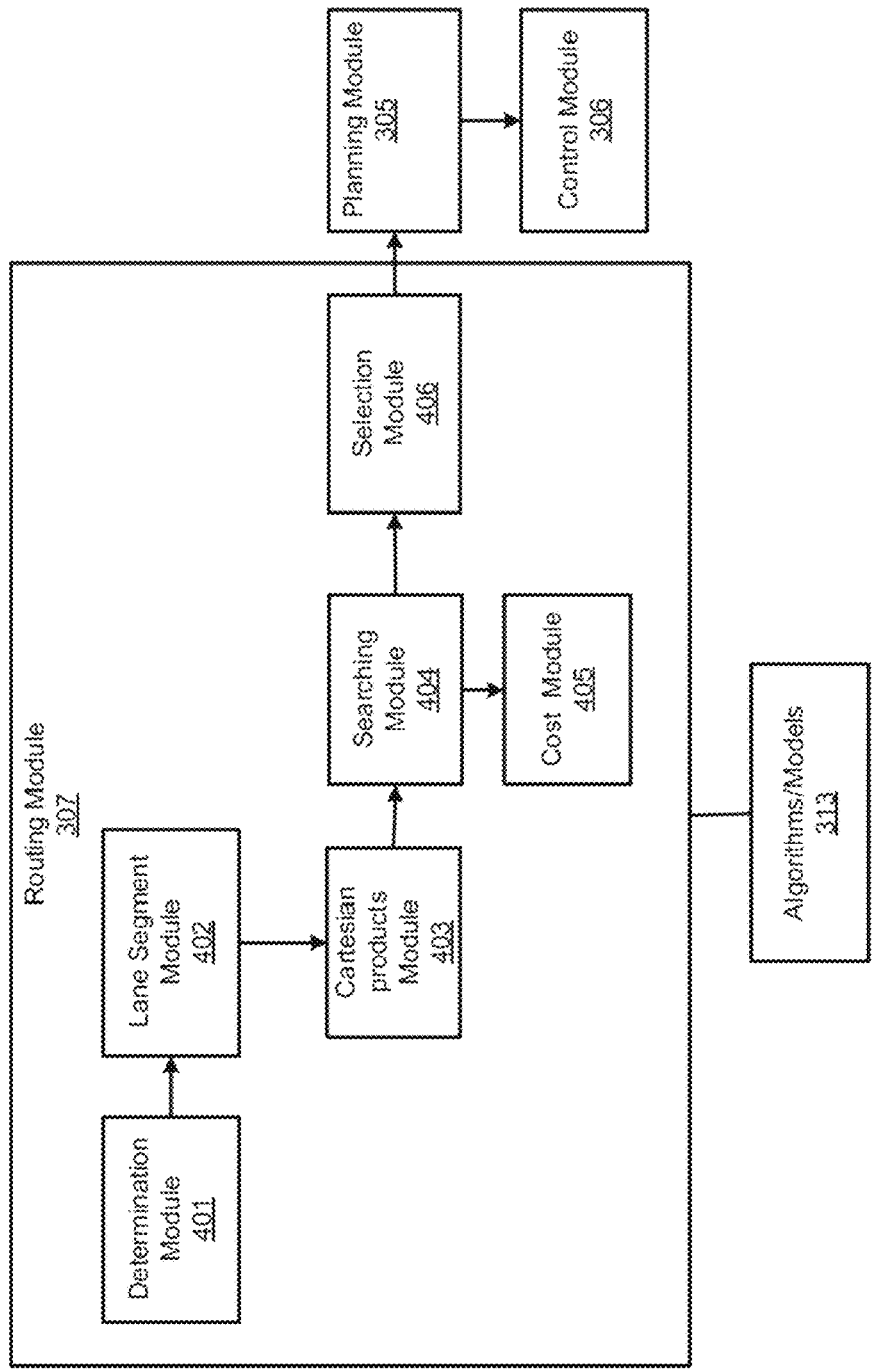
FIG. 5 is a processing flow diagram of a routing module according to one embodiment.

FIG. 4 is a block diagram illustrating an example of a routing module 307 and FIG. 5 is a processing flow diagram of a routing module 307 according to one embodiment. Referring to FIG. 4 and FIG. 5, routing module 307 includes, but is not limited to, determination module 401, lane segment module 402, Cartesian products module 403, searching module 404, cost module 405 and selection module 406. Note that modules 401-406 may be integrated into fewer number of modules or a single module.

Determination module 401 may be configured to determine a starting point, a set of one or more way points, and a destination point of a route along which the ADV is to be driven. Lane segment module 402 may be configured to determine all lane segments near the starting point, the set of way points, and the destination point within a predetermined threshold distance respectively.

In one embodiment, Cartesian products module 403 may be configured to generate Cartesian products of sets based on all the lane segments for the starting point, the set of way points, and the destination point respectively. Searching module 404 may be configured to search for a set of route candidates with an A-star (A*) searching algorithm based on a plurality of nodes representing all the lane segments near the starting point, the set of way points, and the destination point respectively. Cost module 405 may be configured to determine the respective costs of the set of route candidates based on a cost function.

In one embodiment, selection module 406 may be configured to select the route from the set of route candidates based on respective costs of the set of route candidates. Planning module 305 may be configured to plan a trajectory based on the selected route. Control module 306 may be configured to control the ADV to drive along the selected route autonomously.

Figure 6A:
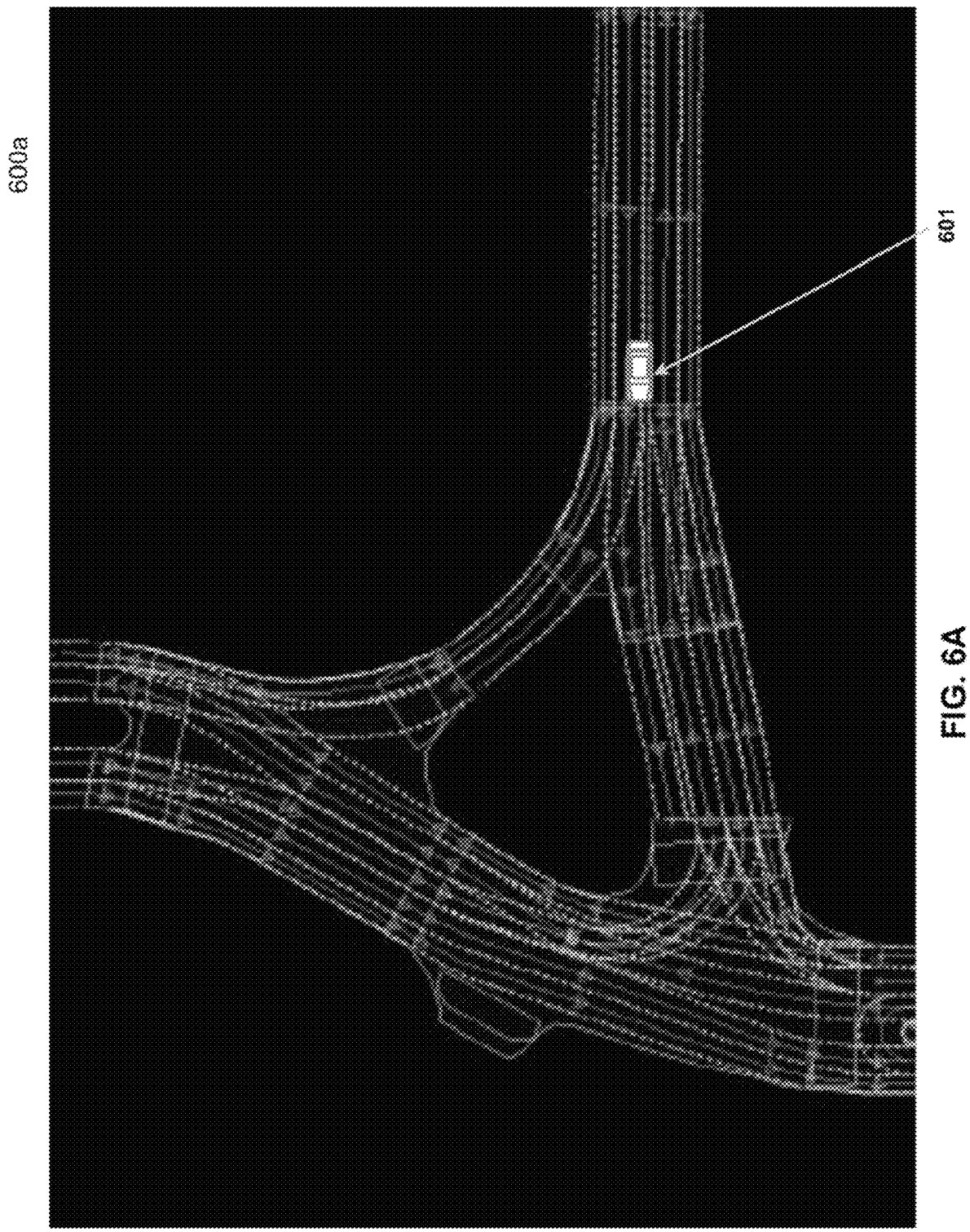
FIGS. 6A-6C illustrate examples of an ADV near a road junction.
Figure 6C:
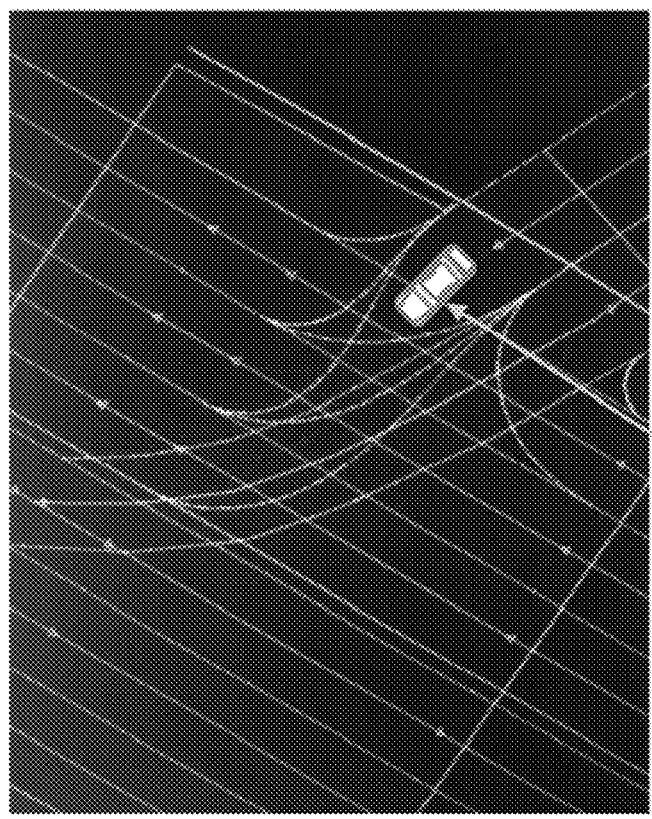
Figure 6B:
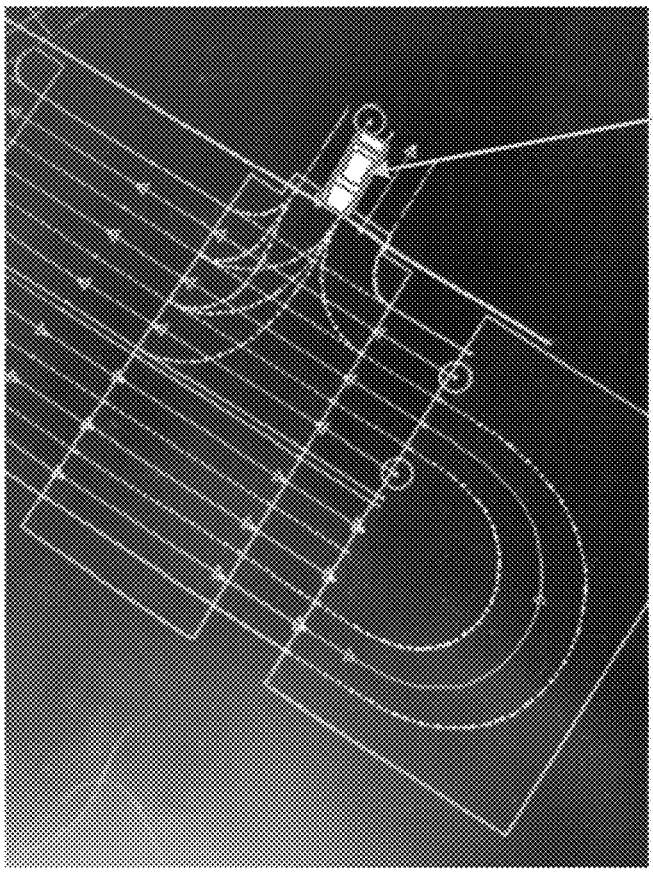

FIGS. 6A-6C illustrate examples 600a, 600b, and 600c of an ADV 601 near a road junction. Navigation route searching is important for autonomous vehicles. Some searching algorithms have been proposed by researchers and engineers for route planning. A* searching algorithm is one of the searching algorithms. A* searching algorithm is a graph traversal and path search algorithm, which is often used in computer science study or robotic industry due to its completeness, optimality, and optimal efficiency. A* searching algorithm may be used for navigation route searching for an ADV. However, there may be some issues when using A* searching algorithm for navigation route searching, for example, when the ADV is near a road junction and/or an intersection. As illustrated in FIGS. 6A-6C, when a start point or a destination point (i.e., end point) of the ADV 601 is located near or in a road junction, unexpected navigation route may be generated. This is mainly because that it is difficult to find a right start search node from a topology map of A* searching algorithm according to the ADV 601's location coordinate when the ADV are located near or in a road junction.

In previous attempt to address the above problems, a nearest lane according to the ADV's position is determined. The nearest lane is used as a first node to search a navigation route to the destination point. For example, A* search algorithm may be performed to search the navigation route using the nearest lane as the first node. However, the nearest lane may not be a correct lane, and the resulted route may be an unexpected route and may not be able to reach to the destination point. Another attempt is to keep trying to find a set of points until the requirements for the right result of navigation route planning are reached. However, it is a time-consuming and laborious work. There may be a need to develop a method to address the unexpected route problems when the ADV is near a road junction or an intersection.

Figure 7A:
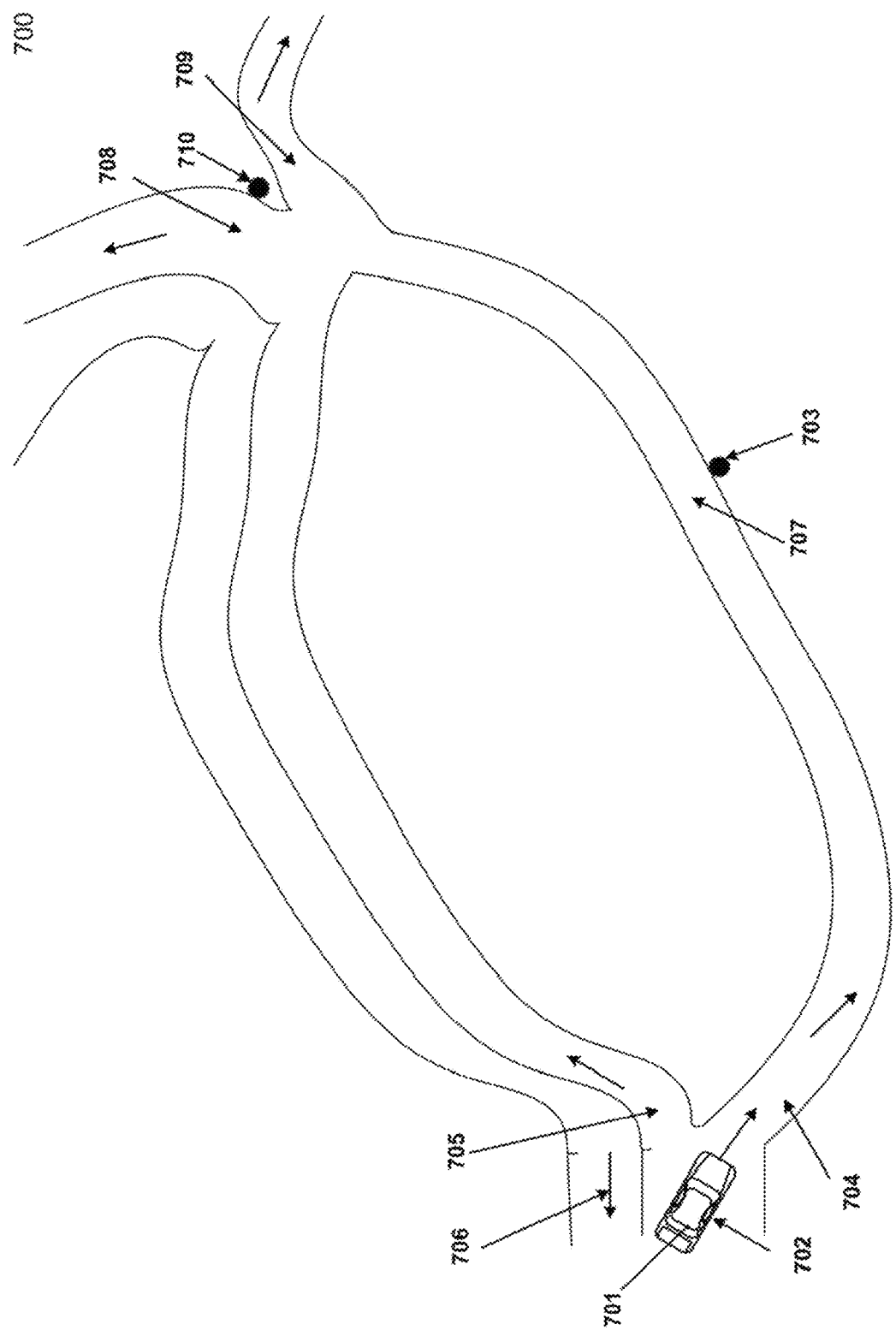
FIG. 7A illustrates an example of a method to address navigation route planning problems when an ADV is near or in a road junction, according to some embodiments.
Figure 8:
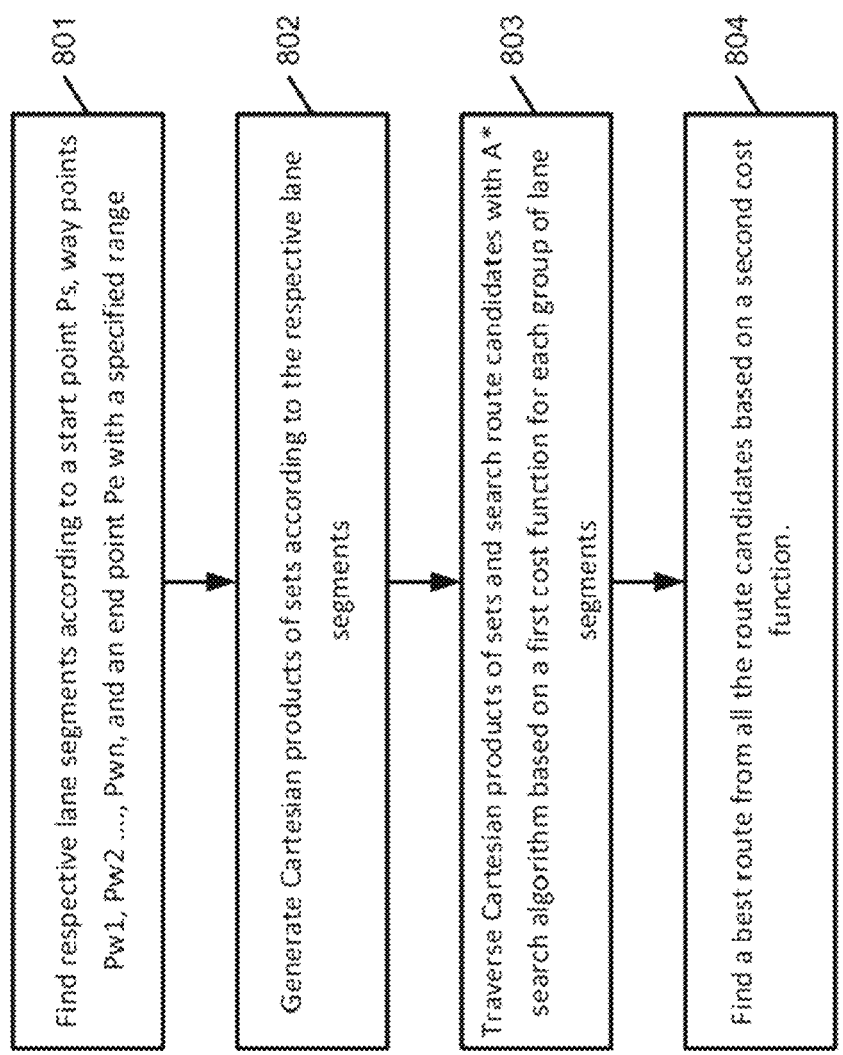
FIG. 8 illustrates a flow diagram of a method to address navigation route planning problems, according to some embodiments.

FIG. 7A illustrates an example 700 of a method to address navigation route planning problems when an ADV 701 is near or in a road junction, according to some embodiments. FIG. 8 illustrates a flow diagram 800 of the method to address navigation route planning problems when the ADV is near or in the road junction, according to some embodiments. The method can address the unexpected results of navigation route planning issues when the ADV 701 is located near or in the road junction or intersection. The method is also suitable for the regular road scenarios. In this method, Cartesian products of sets of topology nodes may be generated according to a start point (e.g., 702), a series of way points (e.g., 703) and a destination point or end point (e.g., 710) of a route of the ADV 701. Then, the results of Cartesian products of sets may be traversed and A* searching algorithm may be used to search all candidate navigation routes. At last, all the candidate navigation routes may be merged and a best navigation route may be selected from all the candidate navigation routes according to their respective costs.

For the road junction with multiple lanes, the start point, the series of way points and the destination point of a route may be expressed in respective coordinates:

Ps: (Xs, Ys, Hs),
Pw: [Pw1, Pw2, . . . , Pwn],
Pw1: (Xw1, Yw1, Hw1),
Pw2: (Xw2, Yw2, Hw2),
. . .
Pwn: (Xwn, Ywn, Hwn),
Pe: (Xe, Ye, He), where Xs, Ys and Hs are X-axis, Y-axis coordinates and a heading direction of the ADV at the start point Ps respectively, Xe, Ye and He are X-axis, Y-axis coordinates and a heading direction of the ADV at the end point Pe respectively, and Xw1, Yw1 and Hw1 are X-axis, Y-axis coordinates and a heading direction of the ADV at a first way point Pw1 respectively, and so on.

Figure 9:
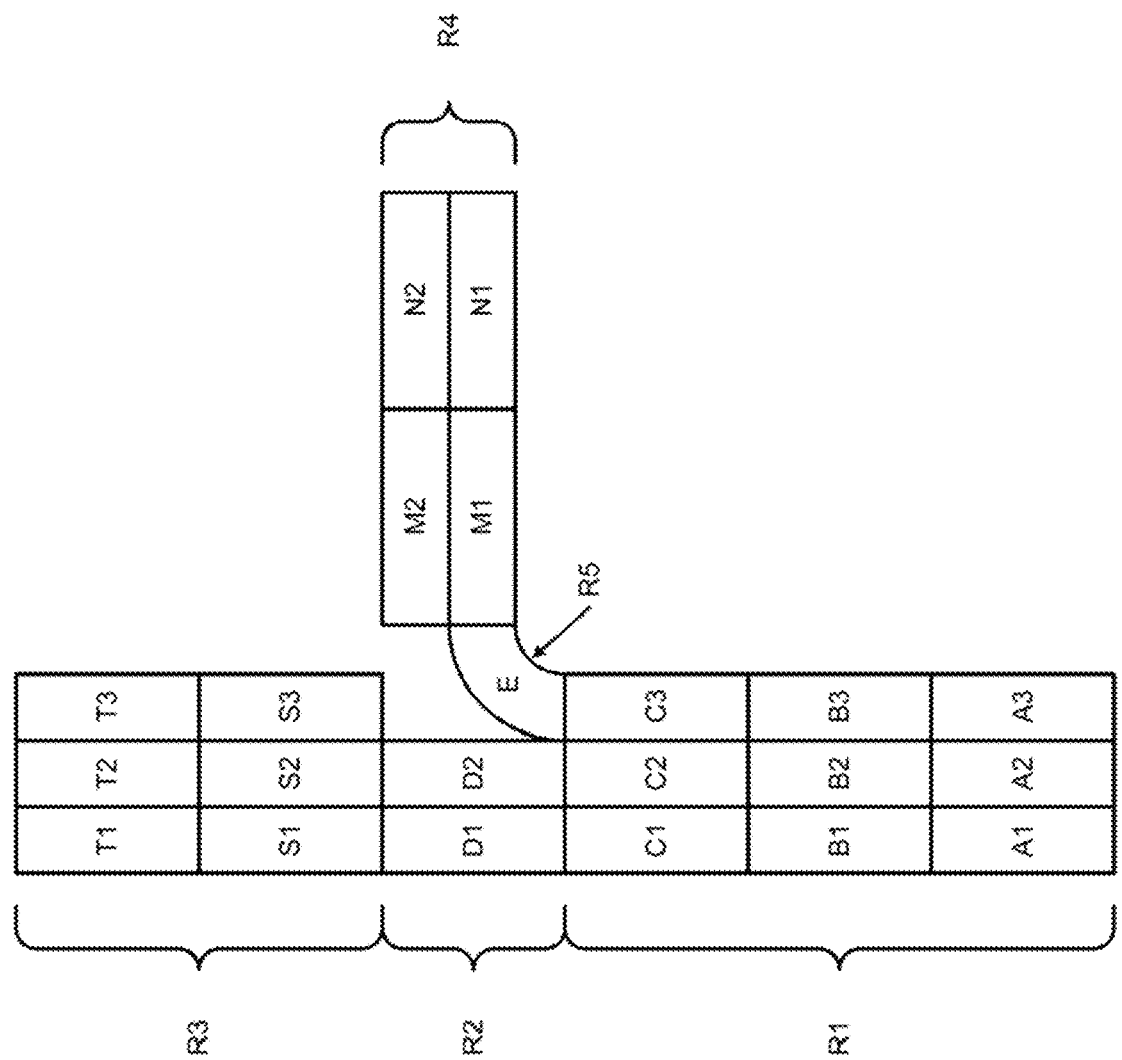
FIG. 9 illustrates an example of lane segments, according to one embodiment.

Referring to FIG. 7A and FIG. 8, the method to address navigation route planning problems may include the following operations. At 801, all respective lane segments according to the start point Ps (e.g., 702), the way points Pw1, Pw2 Pwn (e.g., 703), and the end point Pe (e.g., 710) within a specified range may be determined. The specified range may be 0.2, 0.5, 1, 2, 3, 4, 5, 10 meters, or any values therebetween. In one embodiment, the specified range may be 0.5-3 meters. A lane segment may refer to a portion of a lane, e.g., with uniform characteristics. FIG. 9 illustrates lanes including one or more lane segments.

As an example, as illustrated in FIG. 7A, there may be three lane segments 704, 705 and 706 near the start point Ps 702 within the specified range. The ADV may move forward on lane segment Ls1 704, or lane segment Ls2 705, or take a U-turn onto lane segment Ls3 706. There may be two lane segments Le1 708 and le2 709 near the end point Pe 710 within the specified range. There may be only one way point Pw1 703 and only one lane segment Lw1 707 near the way point Pw1 703 within the specified range. All the lane segments near the start point Ps 702, the way points Pw1, Pw2 Pwn (e.g., 703), and the end point Pe 710 may be expressed as below:

Ps 702→Ls1 704, Ls2 705, Ls3 706
Pw1 703→Lw1 707
Pe 710→Le1 708, Le2 709

At 802, Cartesian products of sets may be generated according to all the lane segments near the start point Ps (e.g., 702), the way points Pw1, Pw2 Pwn (e.g., 703), and the end point Pe (e.g., 710) within the specified range respectively. In mathematics, specifically set theory, the Cartesian product of two sets A and B, denoted A×B, is the set of all ordered pairs (a, b) where a is in A and b is in B. The Cartesian product of two sets is the set of all possible ordered pairs with a first element from the first set and a second element from the second set. The Cartesian product of three sets is the set of all possible ordered groups with a first element from the first set, a second element from the second set and a third element from the third set.

For example, Cartesian products of sets may be generated according to the lane segments 704, 705, 706 near the start point Ps 702, the lane segment 707 near the way point Pw1 703, and the lane segments 708, 709 near the end point Pe 710. The results of Cartesian products of sets include a set of groups of possible ordered lane segments. For example, the results of Cartesian products of sets based on all the respective lane segments near the start point Ps 702, the way point 703, and the end point Pe 710 is shown on Table 1 below. The results of Cartesian products of sets include six groups of possible ordered groups of lane segments in this example.

TABLE 1

An example of results of Cartesian products of sets based on all the lane segments near a start point Ps, a way point Pw1, and a destination point Pe respectively.

| | Start Point Lane Segment | Way Point Lane Segment | Destination Point Lane Segment |
|---|---|---|---|
| Group 1 | Ls1 | Lw1 | Le1 |
| Group 2 | Ls1 | Lw1 | Le2 |
| Group 3 | Ls2 | Lw1 | Le1 |
| Group 4 | Ls2 | Lw1 | Le2 |
| Group 5 | Ls3 | Lw1 | Le1 |
| Group 6 | Ls3 | Lw1 | Le2 |

At 803, a set of route candidates may be determined according to the Cartesian products of sets based on a set of nodes representing all the lane segments (e.g., 704, 705, 706, 707, 708, 709) near the starting point Ps (e.g., 702), the set of way points (e.g., 703), and the destination point Pe (e.g., 710) respectively, for example, by using A* searching algorithm. A* searching algorithm may be used to determine the set of route candidates. A* searching algorithm is an informed search algorithm. Starting from a starting node of a graph, A* aims to find a path to a goal node having a smallest value of a first cost (least distance travelled, shortest time, etc.). A* does this by maintaining a tree of paths originating at the start node and extending those paths one edge at a time until its termination criterion is satisfied. At each iteration of a main loop, A* determines which of its paths to extend based on the first cost of the path and an estimate of the first cost required to extend the path all the way to the goal node. Specifically, A-star selects the path that minimizes the first cost based on the first cost function:

$$f(n)=g(n)+h(n),$$

where n is a next node on the path, g(n) is the first cost of the path from the start node to n node, and h(n) is a heuristic function that estimates the first cost of the shortest path from n to the goal node. A* terminates when the path it chooses to extend is a path from the start node to the goal node or if there are no paths eligible to be extended. The heuristic function is problem-specific.

For each group of ordered lane segments, one route candidate may be determined based on a subset of nodes representing the corresponding group of ordered lane segments using A* search algorithm. For example, as shown in Table 1, there may be a set of six group of possible ordered lane segments in the results of Cartesian product of sets:

Ls1, Lw1, Le1
Ls1, Lw1, Le2
Ls2, Lw1, Le1
Ls2, Lw1, Le2
Ls3, Lw1, Le1
Ls3, Lw1, Le2

In this example, there are six groups of ordered lane segments in the results of Cartesian products of sets, one route candidate may be determined for each group, thus there may be a set of six route candidates. Route candidates may travel across or through the set of nodes representing the possible ordered pairs of lane segments near the starting point Ps (e.g., 702), the set of way points (e.g., 703), and the destination point Pe (e.g., 710) respectively. For each group of the ordered lane segments, one route candidate may travel across or through a subset of the set of nodes representing a corresponding group of ordered lane segments near the starting point Ps (e.g., 702), the set of way points (e.g., 703), and the destination point Pe (e.g., 710) respectively.

A* search algorithm may be used to determine a route candidate based on the first cost for each group of ordered lane segments. A set of route candidates corresponding to the set of nodes representing the possible groups of ordered lane segments may be determined with A* searching algorithm based on the first cost. The first cost is determined based on the first cost function: f(n)=g(n)+h(n), where n is a next node on the path, g(n) is the first cost of the path from the start node to n node, and h(n) is a heuristic function that estimates the first cost of the shortest path from n to the goal node.

At 804, a best route from all the route candidates may be selected according to a second cost function. Route length, the compatibility between road characteristics and vehicles geometric and dynamic characteristics, human preference recommendation may be taken into consideration in the second cost function. In one embodiment, the second cost function may include a route length.

In one embodiment, the second cost function may include dimensions of the ADV, widths of all the lane segments, and/or compatibility between the dimensions of the ADV and the widths of all the corresponding lane segments. For example, a large ADV may be difficult to drive on a narrow road, thus increasing the second cost.

In one embodiment, the second cost function may include dynamic characteristics of the ADV, and where the dynamic characteristics may include a maximum turning radius of the ADV. For example, the ADV may have a maximum turning radius, thus some routes may have a large second cost or are impossible.

In one embodiment, the second cost function may include a difference between a heading direction of the route and a heading direction of the ADV at the start point. For example, if the difference between the heading direction of the route and the heading direction of the ADV at the start point is very large, e.g., larger than 120 degrees, the route may have a large second cost. In one embodiment, the second cost function may include an input of a human preference, for example, avoid road constructions, avoid high ways, avoid traffic, and/or avoid slow roads.

Figure 10:
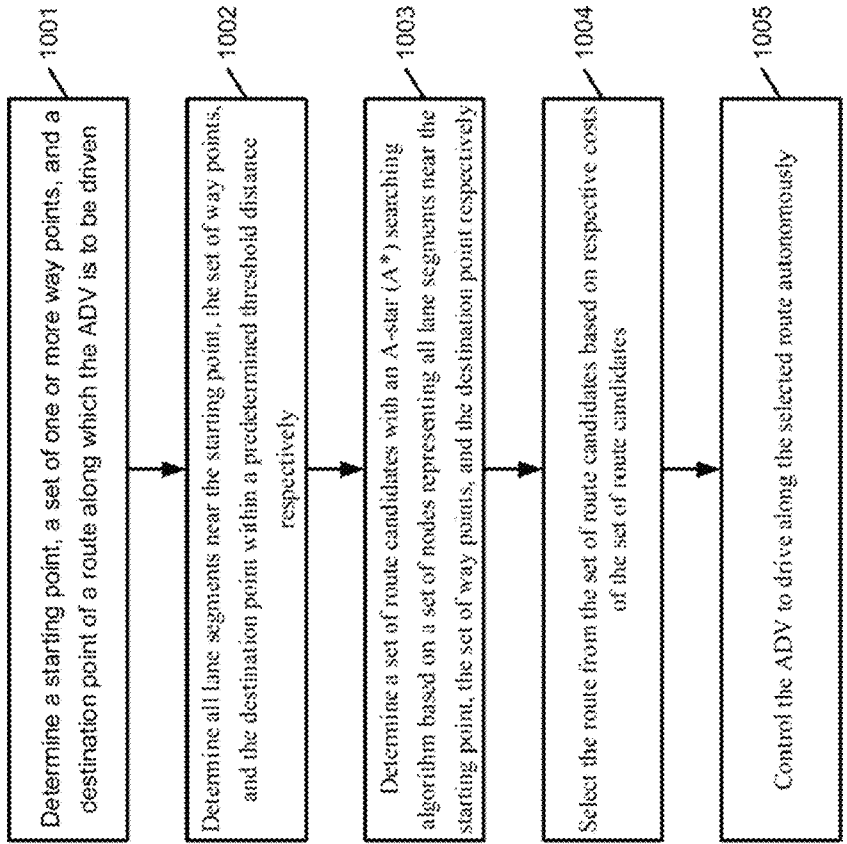
FIG. 10 is a flow diagram illustrating an example of a process to address navigation route planning issues when an ADV is near a road junction, according to one embodiment.

FIG. 10 is a flow diagram illustrating an example of a process to address navigation route planning issues when an ADV is near a road junction, according to one embodiment. Process 1000 may be performed by processing logic which may include software, hardware, or a combination thereof. For example, process 1000 may be performed by routing module 307. Referring to FIG. 10, in operation 1001, processing logic determines a starting point, a set of one or more way points, and a destination point of a route along which the ADV is to be driven. In operation 1002, processing logic determines all lane segments near the starting point, the set of way points, and the destination point within a predetermined threshold distance respectively.

In operation 1003, processing logic determines a set of route candidates with an A-star (A*) searching algorithm based on a set of nodes representing all lane segments near the starting point, the set of way points, and the destination point respectively. In one embodiment, processing logic generates Cartesian products of sets based on all the lane segments for the starting point, the set of way points, and the destination point respectively. In one embodiment, route candidates are determined according to the Cartesian products of sets based on all the lane segments for the starting point, the set of way points, and the destination point respectively. In one embodiment, results of Cartesian products of sets include a set of groups of ordered lane segments, and for each group of the set of groups of ordered lane segments, a route candidate is determined based on a subset of the set of nodes representing the corresponding group according to a respective first cost of the route candidate based on a first cost function.

In operation 1004, processing logic selects the route from the set of route candidates based on respective costs of the set of route candidates. In one embodiment, process logic further determines respective second costs of the set of route candidates based on a second cost function, wherein the second cost function includes a route length. In one embodiment, the second cost function includes dimensions of the ADV, widths of all the lane segments, or compatibility between the dimensions of the ADV and the widths of all the corresponding lane segments. In one embodiment, the second cost function includes dynamic characteristics of the ADV, and wherein the dynamic characteristics includes a maximum turning radius of the ADV. In one embodiment, the second cost function includes a difference between a heading direction of the route and a heading direction of the ADV at the start point. In one embodiment, the second cost function includes an input of a human preference.

In operation 1005, processing logic controls the ADV to drive along the selected route autonomously.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

The invention claimed is:

1. A computer-implemented method for operating an autonomous driving vehicle (ADV), the method comprising:
   determining a starting point, a set of one or more way points, and a destination point of a first route along which the ADV is to be driven;
   determining all lane segments located within a predetermined threshold distance to the starting point, the set of way points, and the destination point respectively;
   generating Cartesian products of sets based on all the lane segments for the starting point, the set of way points, and the destination point respectively, wherein results of Cartesian products of sets include a set of groups of ordered lane segments;
   determining a set of route candidates using an A-star (A*) searching algorithm based on a set of nodes representing all the lane segments located within the predetermined threshold distance to the starting point, the set of way points, and the destination point respectively for the set of groups of the ordered lane segments;
   selecting a second route from the set of route candidates based on respective costs of the set of route candidates; and
   controlling the ADV to drive along the selected route autonomously.

2. The method of claim 1, wherein the starting point or the destination point is located within a first predetermined threshold distance to a road junction.

3. The method of claim 1, wherein the route candidates are determined according to the Cartesian products of sets based on all the lane segments for the starting point, the set of way points, and the destination point respectively.

4. The method of claim 1, wherein for each group of the set of groups of the ordered lane segments, a route candidate is determined based on a subset of the set of nodes representing the corresponding group according to a respective first cost of the route candidate based on a first cost function.

5. The method of claim 4, wherein the respective costs of the set of route candidates include respective second costs of the set of route candidates, and the method further comprises determining the respective second costs of the set of route candidates based on a second cost function, wherein the second cost function includes a route length.

6. The method of claim 5, wherein the second cost function includes dimensions of the ADV, widths of all the lane segments, or compatibility between the dimensions of the ADV and the widths of all the corresponding lane segments.

7. The method of claim 5, wherein the second cost function includes dynamic characteristics of the ADV, and wherein the dynamic characteristics includes a maximum turning radius of the ADV.

8. The method of claim 5, wherein the second cost function includes a difference between a heading direction of the route candidate and a heading direction of the ADV at the start point.

9. The method of claim 5, wherein the second cost function includes an input of a human preference.

10. A non-transitory machine-readable medium having instructions stored therein, which when executed by a processor, cause the processor to perform operations of operating an autonomous driving vehicle (ADV), the operations comprising:
    determining a starting point, a set of one or more way points, and a destination point of a first route along which the ADV is to be driven;
    determining all lane segments located within a predetermined threshold distance to the starting point, the set of way points, and the destination point respectively;
    generating Cartesian products of sets based on all the lane segments for the starting point, the set of way points, and the destination point respectively, wherein results of Cartesian products of sets include a set of groups of ordered lane segments;
    determining a set of route candidates using an A-star (A*) searching algorithm based on a set of nodes representing all the lane segments located within the predetermined threshold distance to the starting point, the set of way points, and the destination point respectively for the set of groups of the ordered lane segments;
    selecting a second route from the set of route candidates based on respective costs of the set of route candidates; and
    controlling the ADV to drive along the selected route autonomously.

11. The medium of claim 10, wherein the starting point or the destination point is located within a first predetermined threshold distance to a road junction.

12. The medium of claim 11, wherein the route candidates are determined according to the Cartesian products of sets based on all the lane segments for the starting point, the set of way points, and the destination point respectively.

13. The medium of claim 12, wherein for each group of the set of groups of the ordered lane segments, a route candidate is determined based on a subset of the set of nodes representing the corresponding group according to a respective first cost of the route candidate based on a first cost function.

14. The medium of claim 13, wherein the respective costs of the set of route candidates include respective second costs of the set of route candidates, and the operations further comprise determining the respective second costs of the set of route candidates based on a second cost function, wherein the second cost function includes a route length.

15. The medium of claim 14, wherein the second cost function includes at least one of dimensions of the ADV, widths of all the lane segments, compatibility between the dimensions of the ADV and the widths of all the corresponding lane segments, dynamic characteristics of the ADV including a maximum turning radius of the ADV, a difference between a heading direction of the route candidate and a heading direction of the ADV at the start point, or an input of a human preference.

16. A data processing system, comprising:
    a processor; and
    a memory coupled to the processor to store instructions, which when executed by the processor, cause the processor to perform operations of operating an autonomous driving vehicle (ADV), the operations including:
       determining a starting point, a set of one or more way points, and a destination point of a first route along which the ADV is to be driven;
       determining all lane segments located within a predetermined threshold distance to the starting point, the set of way points, and the destination point respectively;
       generating Cartesian products of sets based on all the lane segments for the starting point, the set of way points, and the destination point respectively, wherein results of Cartesian products of sets include a set of groups of ordered lane segments;

determining a set of route candidates using an A-star (A*) searching algorithm based on a set of nodes representing all the lane segments located within the predetermined threshold distance to the starting point, the set of way points, and the destination point respectively for the set of groups of the ordered lane segments;

selecting a second route from the set of route candidates based on respective costs of the set of route candidates; and controlling the ADV to drive along the selected route autonomously.

17. The system of claim 16, wherein the starting point or the destination point is located within a first predetermined threshold distance to a road junction.

18. The system of claim 17, wherein the route candidates are determined according to the Cartesian products of sets based on all the lane segments for the starting point, the set of way points, and the destination point respectively.

19. The system of claim 18, wherein for each group of the set of groups of the ordered lane segments, a route candidate is determined based on a subset of the set of nodes representing the corresponding group according to a respective first cost of the route candidate based on a first cost function.

20. The system of claim 19, wherein the respective costs of the set of route candidates include respective second costs of the set of route candidates, and the operations further comprise determining the respective second costs of the set of route candidates based on a second cost function, wherein the second cost function includes a route length.

* * * * *